UNITED STATES PATENT OFFICE.

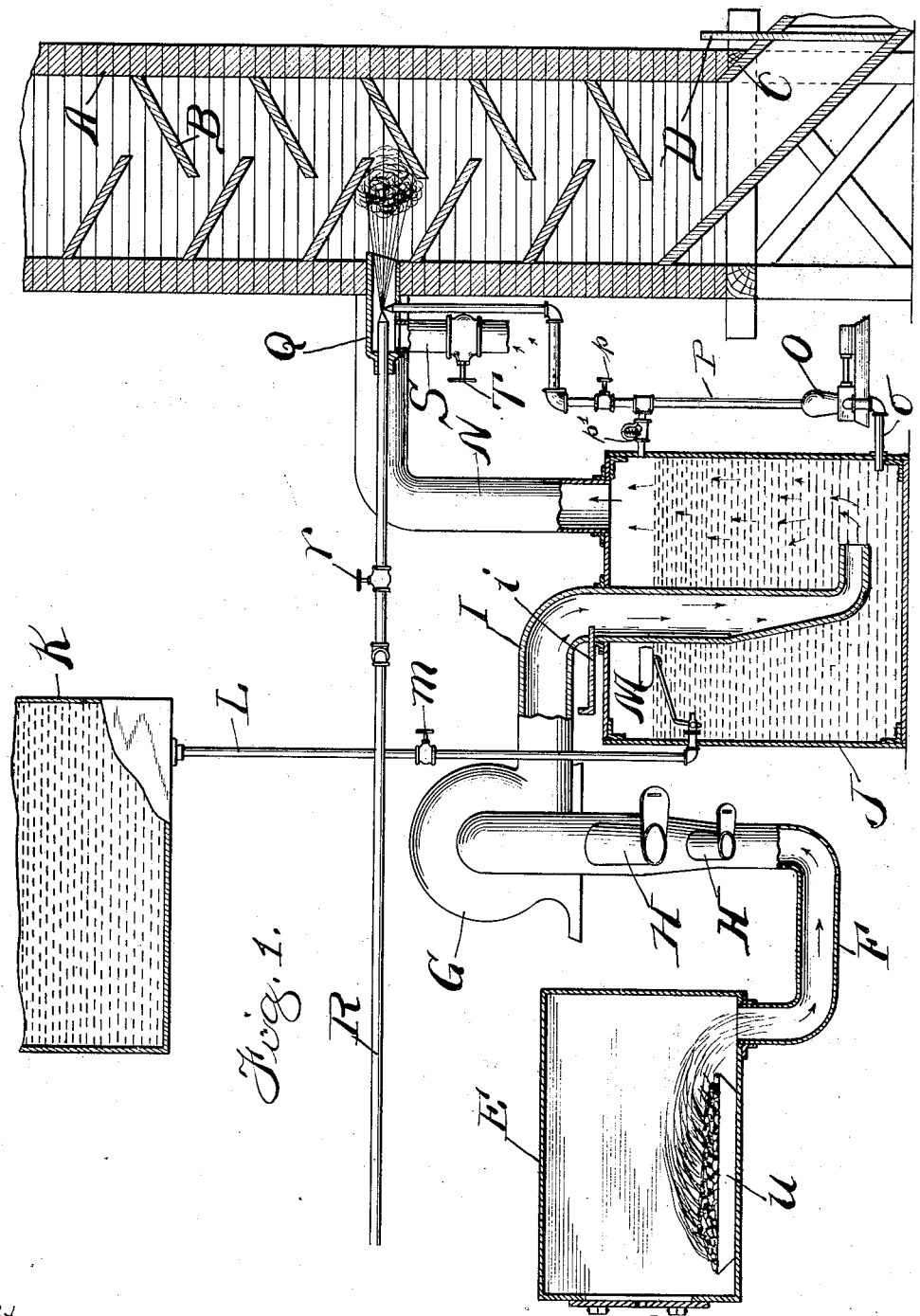

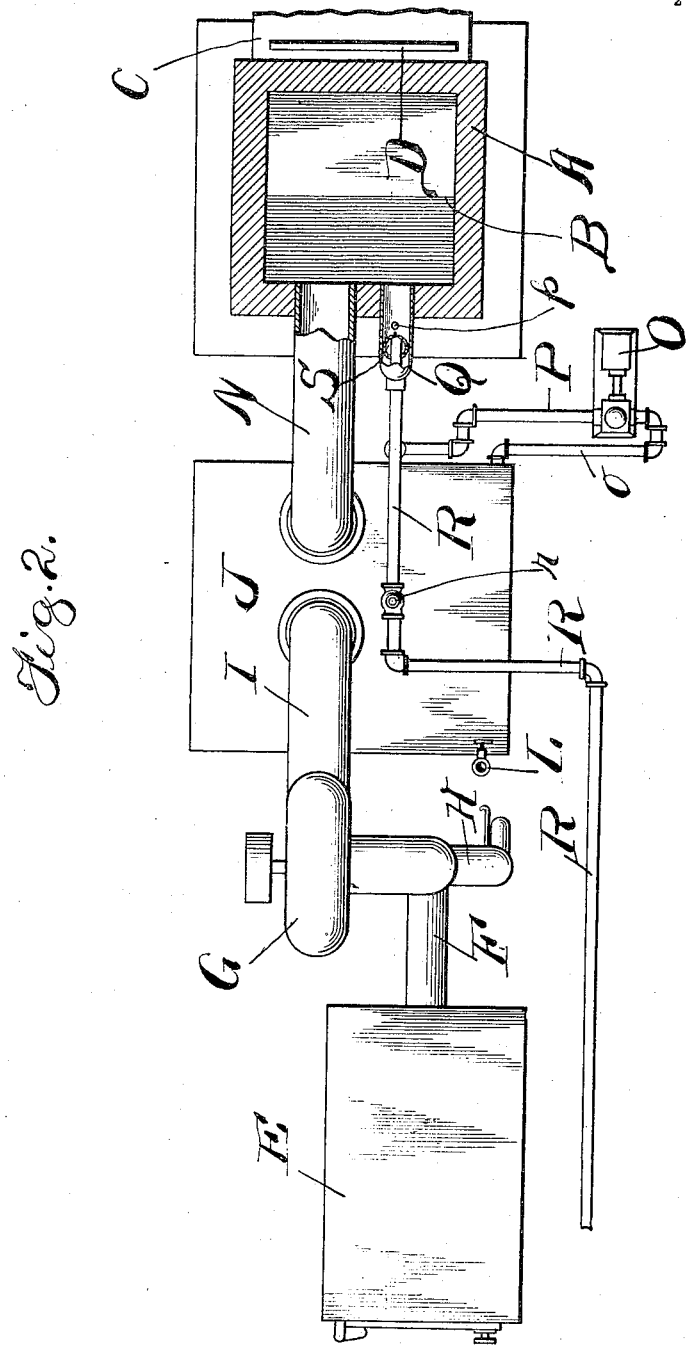

HARRY J. CALDWELL AND JAMES R. BARR, OF EARL PARK, INDIANA.

GRAIN-TREATING APPARATUS.

No. 828,531.   Specification of Letters Patent.   Patented Aug. 14, 1906.

Application filed July 9, 1904. Serial No. 215,895.

*To all whom it may concern:*

Be it known that we, HARRY J. CALDWELL and JAMES R. BARR, citizens of the United States, residing at Earl Park, in the county of Benton and State of Indiana, have invented certain new and useful Improvements in Grain-Treating Apparatus, of which the following is a specification.

Our invention relates to improvements in apparatuses for treating and purifying grain and involving the use of sulfurous or like fumes.

The object of our invention is to provide an apparatus which shall be effective for this purpose, which shall interpose a positive fire-stop or water seal between the furnace and the treating-compartment, which shall provide means for cooling the treating fumes, and which shall in other ways be efficient, simple, durable, and inexpensive for the treatment of grain. These and such other objects as may hereinafter appear are attained by our invention, which is illustrated in one convenient embodiment thereof in the apparatus shown in the accompanying drawings, in which—

Figure 1 is a side elevation, partially in section; and Fig. 2 is a plan view.

Like letters of reference indicate the same parts in the both of the drawings.

Referring by letter to the accompanying drawings, A indicates a casing of a familiar form of grain-treating stack, into the top of which grain is conveyed in any convenient manner.

B represents deflecting-shelves for scattering the grain and retarding its passage through the stack A.

C is an outlet-spout for the escape of the grain. D is a slide to control the passage through said outlet-spout.

E indicates a furnace of any suitable form for the combustion of sulfur.

F is a pipe for conducting the sulfur fumes from the furnace E to a power-fan G.

H H are mixing-valves for controlling the admission of air to the fumes-pipe F.

I is a conduit leading from the eduction-port of the fan G.

J is a tank containing a fluid, preferably water, which may be supplied thereto in any convenient manner. In the drawings we have shown the tank J as supplied from the reservoir K through a pipe L, the flow of water through the pipe L into the tank J being automatically controlled by a float-valve M. The pipe L is also provided with a hand-valve $m$. The pipe I is provided with a slide $i$ and discharges below the surface of the fluid in the tank J.

N is a conduit leading from the tank J to the treating-stack A.

O indicates a force-pump arranged to pump fluid through the pipe $o$ from the tank J and through the pipe P into a nozzle Q, which discharges into the stack A.

R is a steam-pipe leading from any suitable source of steam-supply and terminating within the nozzle Q and preferably adjacent to the discharge end of the pipe P. The pipe R is provided with a hand-valve $r$, and the pipe P is provided with a hand-valve $p$. A by-pass leads from the pipe P into the tank M, the flow of water through said by-pass being controlled by a pressure-valve $p'$ of any familiar type, which is normally held closed by a spring.

While the force-pump O is in constant operation at a uniform speed the quantity of fluid conducted from the tank M to the nozzle Q will be varied to suit different conditions of the grain by means of the hand-valve $p$. Whenever the pump O is pumping a larger volume of water than will pass through the valve $p$ in any given position, the fluid-pressure within the pipe P will open the by-pass valve $p'$, so that such surplus will be conducted back into the tank M.

S is an air-inlet pipe opening into the nozzle Q at one end and open to the atmosphere at its other end and provided with a shut-off valve T.

The operation of this apparatus is as follows: Sulfur being ignited in the pan U in the furnace E, the fan G exhausts the sulfur fumes from the furnace E and forces them through the pipe I, whence they are discharged into the tank J below the fluid-level. The fumes arising through the fluid in the tank J are forced through the pipe N into the stack A, where they are brought in contact with the grain to be treated, the grain passing continuously through the stack A. For the purpose of diluting the fumes and also of cooling the same, if desired, atmospheric air may be admitted into the pipe F in any desired proportion through the mixing-valves H H. The water seal in the tank J, inclosed between the furnace E and the stack A, affords a positive fire-stop, so that all danger of fire to the stack A or to the grain therein is positively eliminated. If desired, the mixing-valves H H may be relied on for the desired cooling of the fumes, the fluid body within the tank J remaining practically stationary, or the fumes without being so cooled may be passed through a stationary body of fluid in the tank J, progressively heating the fluid until the point is reached where the fumes escaping from the tank J through the pipe N will be mixed with vapor arising from the surface of the fluid in the tank J, thus furnishing desirable and in some conditions of grain ample moisture to the interior of the stack A for the treatment of the grain. Furthermore, the sulfurous fumes as they pass through water in the tank J will combine with the hydrogen in the water to form sulfurous acid, which is the required bleaching agent for the treatment of the grain, while the vapor arising from the surface of the water in the tank J may suffice to sufficiently moisten the grain to render it susceptible to the bleaching action of the sulfurous fumes. However, by means of various valves shown we can inject live steam into the stack A through the pipe R and the nozzle Q, the valves $p$ and T being closed, or by opening the valve T means will be provided for the inflow to the nozzle Q of quantities of air, which will serve to condense the steam more rapidly, so as to provide more free moisture within the stack A and neutralize the heat of the steam, or by operating the force-pump O we can draw from the tank J the fumes-impregnated fluid and pump it to the nozzle Q, in which event, if desired, only sufficient steam will be used to blow this stream of water through the nozzle Q into the stack A, or the fluid can be sprayed onto the grain by the force-pump and no steam used. In this last operation of our apparatus there will be a constant flow of water through the tank J, with the result that the water in the tank J will be kept cool and will serve to cool the treating fumes as they pass therethrough.

While we have referred to the tank J as a water seal, it will be understood that this seal may be formed by any suitable fluid.

It will thus be seen that we have devised an apparatus which has a wide range of operation and great flexibility, adapting it to readily meet the widely-varying conditions under which musty, rusty, discolored, and otherwise defective grains must be treated, some grains requiring more moisture than others, some conditions calling for stronger fumes than others, &c.

While we have shown our present invention in what we consider to be its preferred form, obviously many variations in the details of its structure may be made without departing from the spirit of our invention.

We claim—

1. In a grain-treating apparatus, the combination of a treating-compartment, a fumes-generator, a fluid-container, a conduit leading from the fumes-generator into the fluid-container, a conduit leading from the fluid-container and conducting fumes-impregnated fluid therefrom, a nozzle at the end of said conduit, and a steam-jet adapted to discharge into the nozzle and to spray the fluid into the treating-compartment.

2. In a grain-treating apparatus, the combination of a fumes-generator, a water-container, a treating-stack, an automatically-governed water-supply for the water-container, means adapted to withdraw fumes from the generator and to discharge the same into the water-container, and means adapted to withdraw fumes-impregnated water from the container and to discharge the same into the treating-stack.

3. In a grain-treating apparatus, the combination with a grain-treating compartment and means for generating treating fumes, of a conduit for conducting said fumes to said treating-compartment, a water seal interposed in said conduit, and additional means for conducting water from said water seal and forcing the same in a spray into said treating-compartment.

4. In a grain-treating apparatus, the combination with a treating-compartment in open communication with the air, of means for generating treating fumes, a conduit for conducting said fumes to said treating-compartment, a water seal interposed in said conduit, a nozzle discharging into the treating-compartment, means for conducting water from said water seal into said nozzle, and means for spraying said water through said nozzle into said treating-compartment.

5. In a grain-treating apparatus, the combination with a grain-treating compartment, of means for generating the treating fumes, a conduit for conducting said fumes into said treating-compartment, a water seal interposed in said conduit, means for supplying moisture to the interior of said treating-compartment, said means comprising a nozzle discharging into said compartment, means for conducting water from said water seal into said nozzle, and a steam-pipe discharging into said nozzle.

6. In a grain-treating apparatus, the combination with a treating-compartment, of means for generating treating fumes, a conduit for conducting said fumes into said treating-compartment, means for creating a positive current of said fumes through said conduit, a water seal interposed in said conduit, means for maintaining the water at a desired level within said conduit, and means for furnishing moisture to the interior of said treating-compartment, said means comprising a nozzle discharging into said compartment, a steam-jet discharging into said nozzle, and means for conducting water from said water seal to the interior of said treating-compartment.

7. In a grain-treating apparatus, the combination with a grain-treating compartment and means for generating treating fumes, of a conduit for conducting said fumes to said treating-compartment, a water seal interposed in said conduit, and additional means for conducting water and forcing same in a spray into said treating-compartment.

8. In a grain-treating apparatus, the combination with a grain-treating compartment in open communication with the air, and means for generating treating fumes, of a conduit for conducting said fumes to said treating-compartment, a water seal interposed in said conduit, and additional means for conducting water from said water seal and forcing the same in a spray into said treating-compartment.

9. In a grain-treating apparatus, the combination with a grain-treating compartment in open communication with the air, of means for generating the treating fumes, a conduit for conducting said fumes into said treating-compartment, a water seal interposed in said conduit, means for supplying moisture to the interior of said treating-compartment, said means comprising a nozzle discharging into said compartment, means for conducting water from said water seal into said nozzle, and a steam-pipe discharging into said nozzle.

10. The combination with a grain-treating stack, of means for generating treating fumes, a conduit arranged to conduct said fumes to said treating-stack, and means for injecting condensed moisture into said stack, said means comprising a nozzle, a water-pipe discharging into said nozzle, means for causing a flow of water through said water-pipe, and means projecting into said nozzle adjacent and at an angle to the end of said water-pipe, all so arranged that water flowing out of said water-pipe will be sprayed in said stack.

11. The combination of a source of treating fumes, a water seal, a water-supply therefor, automatically-actuated means for maintaining a constant level in said water seal, a conduit leading from the source of fumes to the water seal, means in the path of the conduit adapted to force the fumes into the water seal, a treating-chamber adapted to receive grain, and a conduit leading from the water seal and opening into the treating-chamber.

12. The combination of a grain-treating stack, a fumes-generating furnace, a body of water adapted to become impregnated with fumes from said furnace, means adapted to conduct said water to the treating-stack, and a steam-jet adapted to spray said water into the stack.

13. The combination of a grain-treating stack, a fluid-container, an automatically-controlled water-supply therefor adapted to maintain a constant level therein, means adapted to furnish impregnating fumes to the water within said container, a pipe leading from said container and adapted to conduct water therefrom to the stack, a steam-jet to spray the water into the stack, and a fumes-conduit leading from said container and adapted to conduct fumes therefrom to said stack.

HARRY J. CALDWELL.
JAMES R. BARR.

Witnesses:
S. B. HOUSER,
JAMES BOLDMAN.